US011059560B2

(12) United States Patent
Switzer et al.

(10) Patent No.: US 11,059,560 B2
(45) Date of Patent: Jul. 13, 2021

(54) WINDOW ASSEMBLY FOR USE IN A VEHICLE

(71) Applicant: The Boeing Company, Chicago, IL (US)

(72) Inventors: Lon Eric Switzer, Marysville, WA (US); Paul Joseph Wilcynski, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 504 days.

(21) Appl. No.: 16/135,353

(22) Filed: Sep. 19, 2018

(65) Prior Publication Data

US 2020/0086965 A1 Mar. 19, 2020

(51) Int. Cl.
*B64C 1/14* (2006.01)
*E06B 9/30* (2006.01)
*E06B 9/24* (2006.01)

(52) U.S. Cl.
CPC .............. *B64C 1/1484* (2013.01); *E06B 9/30* (2013.01); *E06B 2009/2488* (2013.01)

(58) Field of Classification Search
CPC . B64C 1/1484; B64C 1/14; E06B 9/30; E06B 9/2447; E06B 2009/2458; E06B 2009/2452
See application file for complete search history.

(56) References Cited

U.S. PATENT DOCUMENTS

| 3,691,686 | A | | 9/1972 | Donegan |
| 3,906,669 | A | * | 9/1975 | Vorguitch ............. B64C 1/1492 49/372 |
| 4,773,697 | A | | 9/1988 | Svensson |
| 4,953,610 | A | * | 9/1990 | Phillips ................... E06B 9/262 160/115 |
| RE34,273 | E | * | 6/1993 | Phillips ................... E06B 9/262 160/115 |
| 6,523,880 | B1 | | 2/2003 | Yako |
| 7,137,428 | B1 | | 11/2006 | Alford |

(Continued)

FOREIGN PATENT DOCUMENTS

| AT | 002252 U1 | 7/1998 |
| EP | 2236730 A2 | 10/2010 |

OTHER PUBLICATIONS

European Search Report regarding European Patent Application No. 19198362.6 dated Dec. 6, 2019; pp. 1-7.

(Continued)

*Primary Examiner* — Brian M O'Hara

(74) *Attorney, Agent, or Firm* — Armstrong Teasdale LLP

(57) ABSTRACT

A window assembly for use in a vehicle including a window frame including a first end and a second end opposite the first end, and an opaque shade movable relative to the window frame, wherein the opaque shade includes a first tab formed at a bottom end of the opaque shade. A transparent shade is movable relative to the window frame, wherein the transparent shade includes a second tab formed at a bottom end of the transparent shade. The first tab and the second tab are configured for selective integration with each other to enable dependent movement of the opaque shade and the transparent shade with each other, and to enable independent movement of the opaque shade and the transparent shade relative to each other.

20 Claims, 12 Drawing Sheets

(56) References Cited

U.S. PATENT DOCUMENTS

| | | | |
|---|---|---|---|
| 7,510,146 B2* | 3/2009 | Golden | B64C 1/1484 |
| | | | 244/129.3 |
| 7,537,039 B2 | 5/2009 | Fischer | |
| 7,690,414 B2 | 4/2010 | Knowles | |
| 8,157,214 B2 | 4/2012 | Schwarz et al. | |
| 9,238,508 B2* | 1/2016 | Laton | B63C 9/04 |
| 9,539,883 B2* | 1/2017 | Snider | B60J 7/0015 |
| 9,592,902 B2 | 3/2017 | Perkins et al. | |
| 9,677,329 B2* | 6/2017 | Knowles | E05F 15/603 |
| 2008/0078877 A1 | 4/2008 | Switzer et al. | |
| 2008/0190568 A1 | 8/2008 | Schwarz et al. | |
| 2009/0314439 A1 | 12/2009 | Waters | |
| 2014/0209746 A1 | 7/2014 | Dunn | |
| 2016/0362168 A1 | 12/2016 | Busscher et al. | |

OTHER PUBLICATIONS

Aeroshade Technologies, Manual Window Shades, product information available at https://www.aero-shade.com/home_021.htm; last visited Sep. 13, 2018.

Harrison, Kirby J.; "Aerospace Technology's Many Ways to Shade"; NBAA Convention News, Oct. 30, 2012; available at https://www.ainonline.com/aviation-news/business-aviation/2012-10-30/aerospace-technologys-many-ways-shade; last visited Sep. 13, 2018.

JBRND Window Shades, product information available at http://jbrnd.com/products/windows/; last visited Sep. 13, 2018.

\* cited by examiner

WINDOW ASSEMBLY FOR USE IN A VEHICLE

FIELD

The field of the present disclosure relates generally to window shades in a vehicle and, more specifically, to a dual retractable window shade assembly.

BACKGROUND

In at least some known vehicles, such as passenger aircraft, a passenger has the ability to manually alter the amount of light that shines through a window in the vehicle. For example, the windows on at least some known passenger aircraft include a plastic shade that is slidable relative to the window for selectively covering a window opening. The plastic shade is typically opaque such that the passage of light through the window opening and into a passenger compartment of the aircraft is blocked when the shade is fully drawn. However, retracting the shade from the fully drawn position may result in the passenger compartment being suddenly flooded with light, which may be undesirable from a passenger perspective. At least some known vehicles have dual retractable window shades, where one window shade is a darker opaque shade than the other window shade. The darker shade generally blocks the passage of light therethrough, and the lighter shade allows some light to pass therethrough such that the passenger has the ability to select a desired level of brightness. However, the window shades are independently movable relative to each other, which enables the passenger compartment to be flooded with light if the lighter shade is retracted before the darker shade.

BRIEF DESCRIPTION

In one aspect, a window assembly for use in a vehicle is provided. The window assembly includes a window frame including a first end and a second end opposite the first end, and an opaque shade movable relative to the window frame, wherein the opaque shade includes a first tab formed at a bottom end of the opaque shade. A transparent shade is movable relative to the window frame, wherein the transparent shade includes a second tab formed at a bottom end of the transparent shade. The first tab and the second tab are configured for selective integration with each other to enable dependent movement of the opaque shade and the transparent shade with each other, and to enable independent movement of the opaque shade and the transparent shade relative to each other.

In another aspect, a vehicle is provided. The vehicle includes an exterior skin, an interior wall spaced a distance from the exterior skin, and a window frame coupled to the interior wall. The window frame includes a first end and a second end opposite the first end. An opaque shade is movable relative to the window frame, wherein the opaque shade includes a first tab formed at a bottom end of the opaque shade. A transparent shade is movable relative to the window frame, wherein the transparent shade includes a second tab formed at a bottom end of the transparent shade. The first tab and the second tab are configured for selective integration with each other to enable dependent movement of the opaque shade and the transparent shade with each other, and to enable independent movement of the opaque shade and the transparent shade relative to each other.

In yet another aspect, a window assembly for use in a vehicle is provided. The window assembly includes a window frame including a first end and a second end opposite the first end, and an opaque shade movable relative to the window frame, wherein the opaque shade comprises a first tab formed at a bottom end of the opaque shade. A transparent shade is movable relative to the window frame, wherein the transparent shade includes a second tab formed at a bottom end of the transparent shade. The first tab and the second tab are configured for selective integration such that the second tab is exposed when the opaque shade is retracted relative to the transparent shade, and such that the second tab is hidden when the opaque shade is coextensive with the transparent shade.

DETAILED DESCRIPTION

The implementations described herein relate to a dual retractable window shade assembly. More specifically, the assembly described herein includes an opaque shade and a transparent shade that is tinted. The opaque shade and the transparent shade each include a tab formed at the bottom ends thereof. The tabs provide a structure for a passenger to grip such that the passenger can manually open and close the shades. The tabs are also designed for selectively integration with each other to enable dependent movement of the shades with each other, but also to enable independent movement of the shades relative to each other. For example, the tabs are separated from each other when the shades are in a fully retracted position, which enables the passenger to select which shade to draw over a window opening. If the passenger draws the opaque shade, the tab on the opaque shade engages the tab on the transparent shade such that both shades are drawn together. As such, the transparent shade is already drawn when the passenger decides to retract the opaque shade, which facilitates automatically filtering the amount of light allowed to shine the window opening. In addition, when the shades are fully drawn, the tabs are nested together in a manner that provides access to the tab on the opaque shade, but restricts access to the tab on the transparent shade. Thus, the passenger is restricted from retracting the transparent shade before the opaque shade, thereby limiting unintentional flooding of light through the window opening. As such, the window shade assembly described herein provides an enhanced travel experience for passengers of a vehicle in a user-friendly manner.

As used herein, an element or step recited in the singular and preceded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
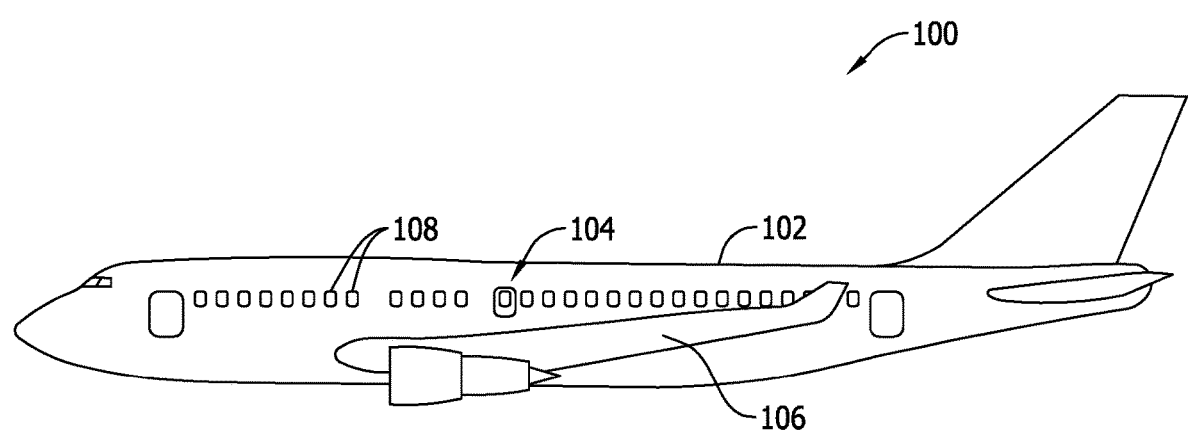
FIG. 1 is a side view illustration of an example aircraft.

FIG. 1 is a side view illustration of a vehicle such as an aircraft 100. In the example implementation, aircraft 100 includes a fuselage 102 defining a passenger compartment 104, and a wing 106 coupled to and extending from fuselage 102. Fuselage 102 also includes a plurality of window assemblies 108 extending along fuselage 102. Window assemblies 108 are selectively operable to provide passengers seated within passenger compartment 104 with a view exterior of aircraft 100.

FIGS. 2-7 are illustrations of a window assembly 108 in various stages of operation. In the example implementation, window assembly 108 includes a window frame 110, an opaque shade 112, and a transparent shade 114. Opaque shade 112 and transparent shade 114 are movable relative to window frame 110. Opaque shade 112 and transparent shade 114 are rigid parts that maintain their original shape when moved relative to window frame 110. Opaque shade 112 is positioned inward from transparent shade 114 relative to passenger compartment 104 (i.e., an interior) of aircraft 100 (both shown in FIG. 1). Opaque shade 112 has a visible light transmittance value of about 0 percent. Transparent shade 114 is tinted and has a visible light transmittance value greater than about 1 percent, greater than about 10 percent, or greater than about 25 percent.

Window frame 110 has a first end 116 and a second end 118 opposite first end 116. Opaque shade 112 and transparent shade 114 are movable relative to window frame 110. For example, opaque shade 112 and transparent shade 114 are both selectively retractable within, and selectively extendable from, first end 116 of window frame 110. In the example implementation, opaque shade 112 includes a first tab 120 formed at a bottom end 122 thereof, and transparent shade 114 includes a second tab 124 formed at a bottom end 126 thereof. Thus, first tab 120 and second tab 124 provide passengers seated within passenger compartment 104 with the ability to manually locate opaque shade 112 and transparent shade 114 in a desired position.

In addition, opaque shade 112 and transparent shade 114 are selectively integrated to enable dependent movement of opaque shade 112 and transparent shade 114 with each other, and to enable independent movement of opaque shade 112 and transparent shade 114 relative to each other. For example, as will be explained in more detail below, first tab 120 and second tab 124 are configured for selective integration to enable the dependent and independent movement of opaque shade 112 and transparent shade 114. The selective integration facilitates dependent retraction of opaque shade 112 with transparent shade 114, and facilitates dependent extension of transparent shade 114 with opaque shade 112. That is, opaque shade 112 is dependently retractable with transparent shade 114 such that transparent shade 114 is not retractable past opaque shade when transparent shade 114 is moved towards first end 116, and transparent shade 114 is dependently extendable with opaque shade 112 such that opaque shade 112 is not extendable past transparent shade 114 when opaque shade 112 is moved from first end 116. The selective integration also facilitates independent retraction of opaque shade 112 relative to transparent shade 114, and facilitates independent extension of transparent shade 114 relative to opaque shade 112.

Figure 2:
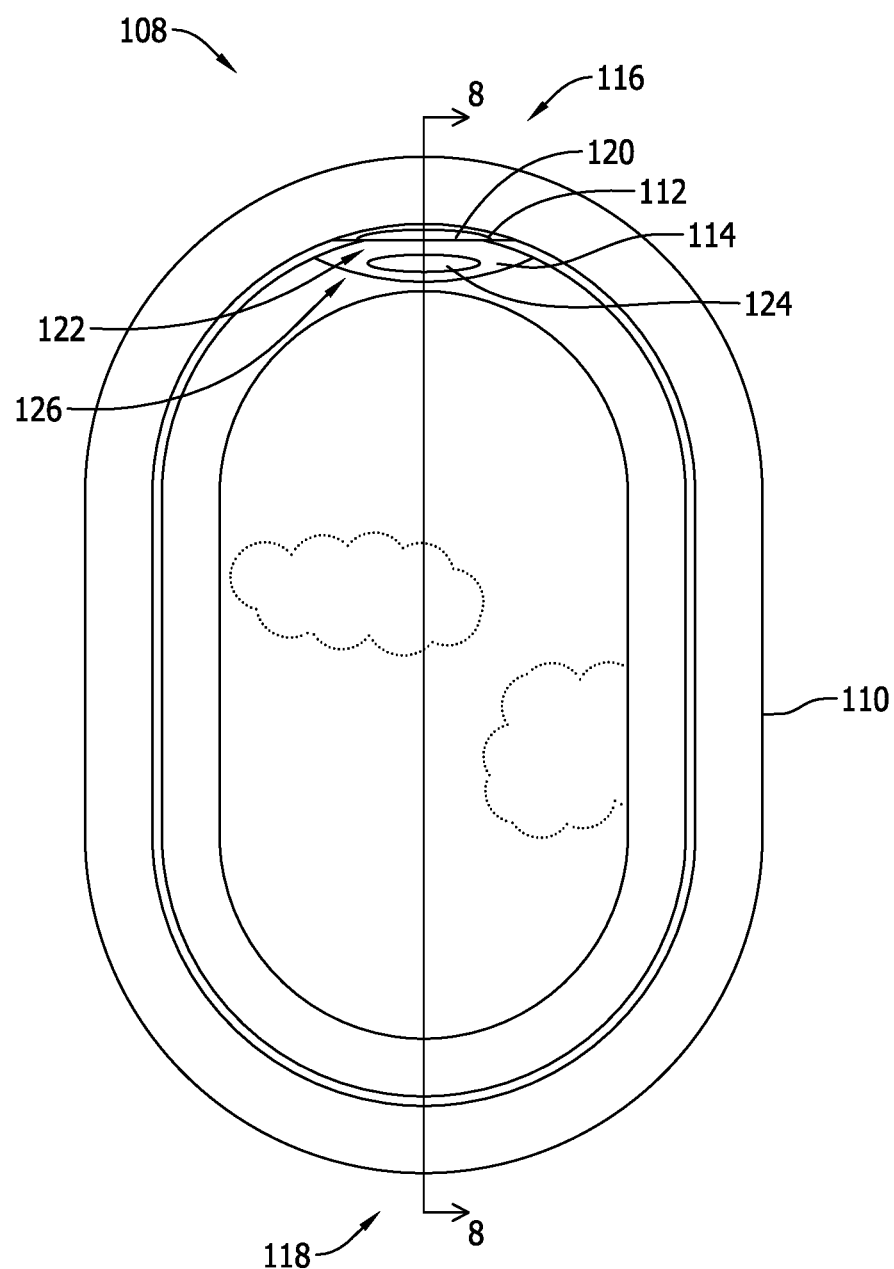
FIG. 2 is an illustration of a window assembly having its shades retracted.

For example, referring to FIG. 2, opaque shade 112 and transparent shade 114 are both fully retracted within first end 116 of window frame 110. First tab 120 and second tab 124 are separated from each other when opaque shade 112 and transparent shade 114 are both in a fully retracted position. As such, either opaque shade 112 or transparent shade 114 may be drawn based on a level of light passage into passenger compartment 104 (shown in FIG. 1) that is desired by a passenger.

Figure 3:
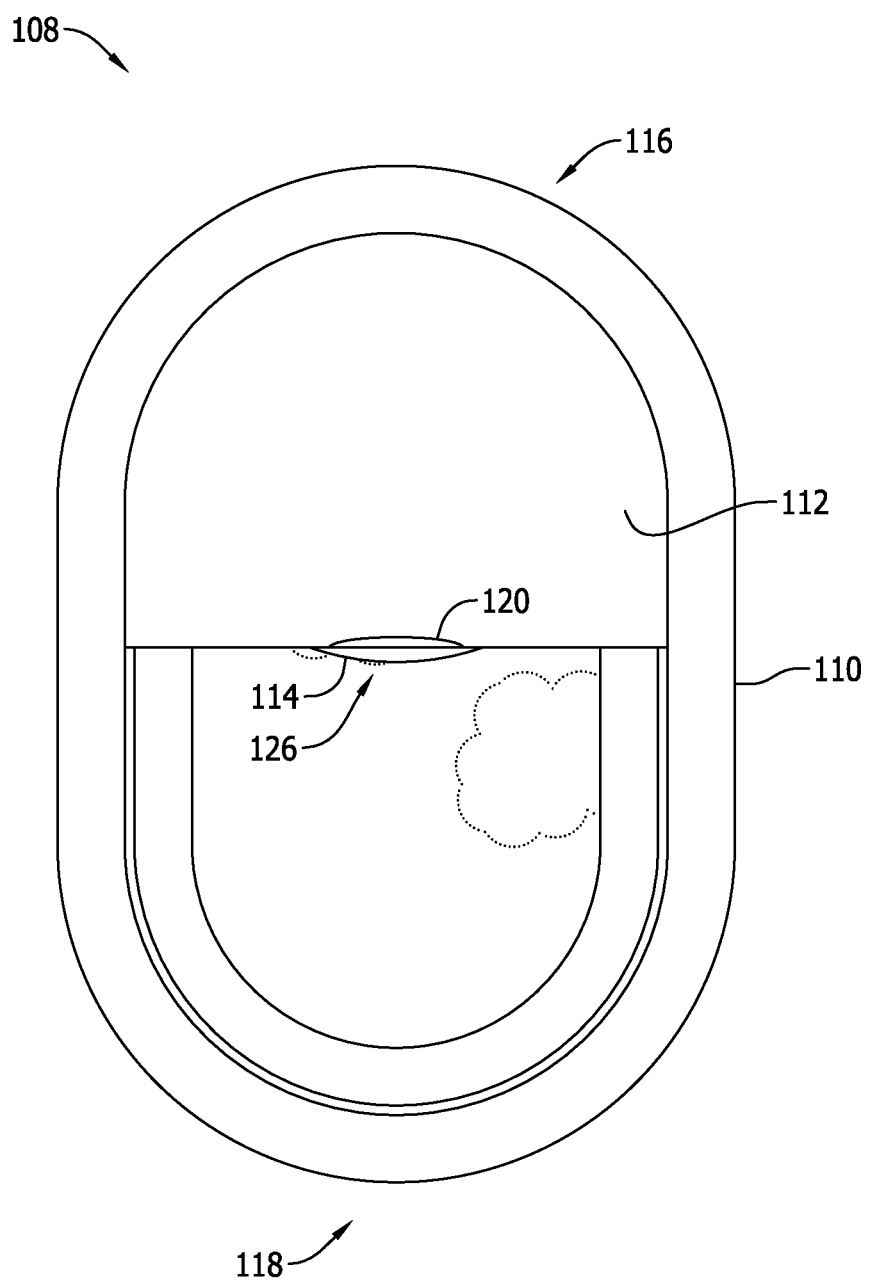
FIG. 3 is an illustration of the window assembly shown in FIG. 2 having a first shade and a second shade partially drawn.

Referring to FIG. 3, opaque shade 112 is extended from first end 116 of window frame 110 to an intermediate position between first end 116 and second end 118 (i.e., opaque shade 112 is partially drawn). Extending opaque shade 112 from first end 116 of window frame 110 facilitates integrating first tab 120 with second tab 124 (not shown in FIG. 3). When first tab 120 is integrated with second tab 124, transparent shade 114 is dependently extendable from first end 116 along with opaque shade 112. As such, as illustrated in FIG. 3, transparent shade 114 is extended from first end 116 of window frame 110 to the intermediate position along with opaque shade 112. Thus, transparent shade 114 is automatically drawn and is positioned to reduce the passage of light into passenger compartment 104 if opaque shade 112 is retracted relative to transparent shade 114 from the intermediate position.

When first tab 120 and second tab 124 are integrated with each other, access to transparent shade 114 and to second tab 124 is at least partially restricted. For example, first tab 120 and second tab 124 are nested with each other when opaque shade 112 and transparent shade 114 are coextensive and positioned at the same location between first end 116 and second end 118. When first tab 120 and second tab 124 are nested with each other, only first tab 120 is accessible to a passenger seated within passenger compartment 104 (shown in FIG. 1). As such, the passenger only has the ability to grip first tab 120, and opaque shade 112 and transparent shade 114 are drawn automatically and simultaneously when opaque shade 112 is extended from first end 116.

In addition, transparent shade 114 is at least partially obscured from view from within passenger compartment 104 when opaque shade 112 and transparent shade 114 are coextensive and positioned at the same location between first end 116 and second end 118. That is, transparent shade 114 is hidden behind opaque shade 112 and only a portion of bottom end 126 of transparent shade 114 is exposed when opaque shade 112 and transparent shade 114 are coextensive. As such, only opaque shade 112 is readily apparent to the passenger such that the passenger is encouraged to retract opaque shade 112 independently of transparent shade 114. However, the passenger also has the ability to grip bottom end 126 to facilitate independent extension of transparent shade 114 relative to opaque shade 112.

Figure 4:
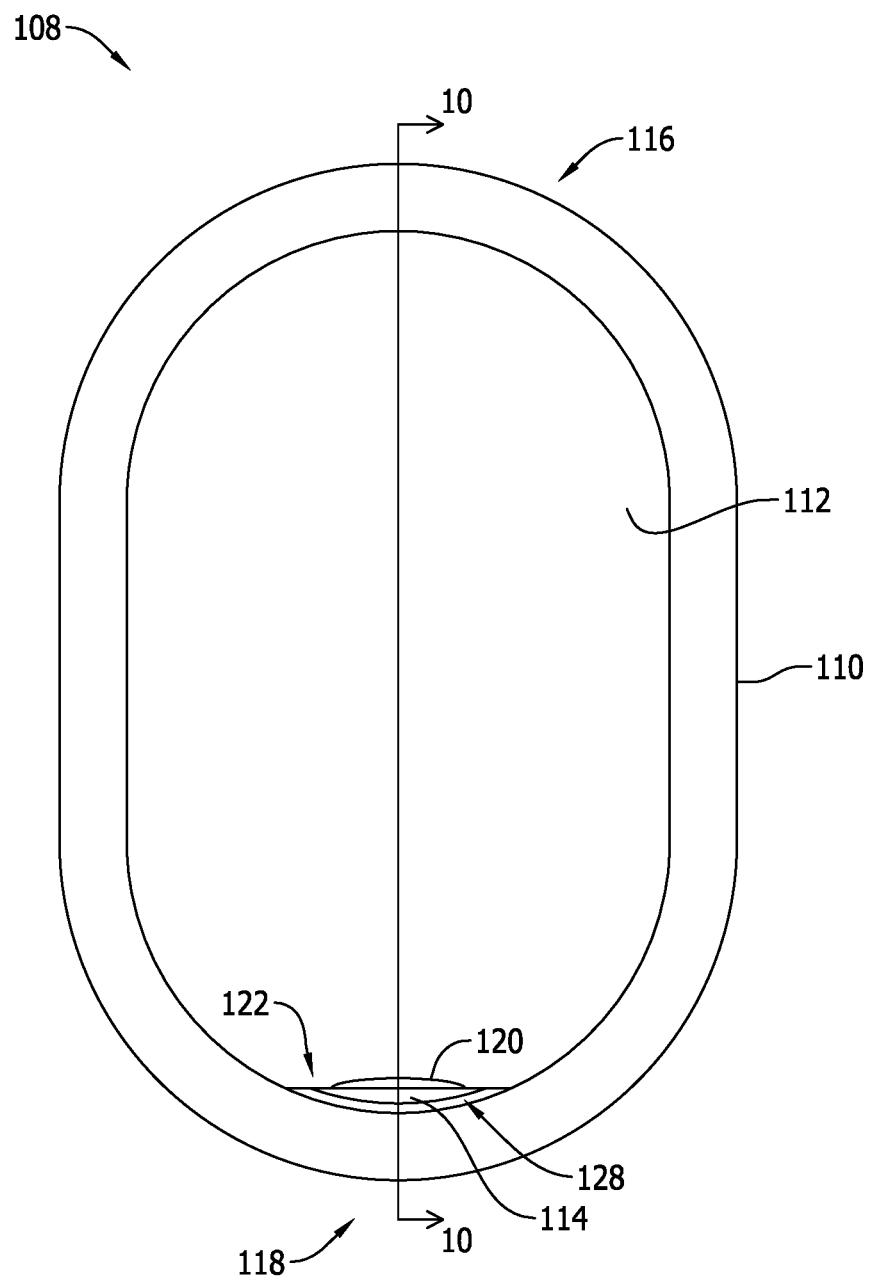
FIG. 4 is an illustration of the window assembly shown in FIG. 2 having the first shade and the second shade fully drawn.

Referring to FIG. 4, opaque shade 112 and transparent shade 114 (shown in FIG. 3) are both fully extended and in a closed position (i.e., opaque shade 112 and transparent shade 114 are both fully drawn). Although transparent shade 114 is not visible in FIG. 4, opaque shade 112 and transparent shade 114 are selectively integrated to enable dependent movement of transparent shade 114 with opaque shade 112 when extended from first end 116. First tab 120 and second tab 124 (not shown in FIG. 4) are nested with each other when opaque shade 112 and transparent shade 114 are both in a fully extended position. When first tab 120 and second tab 124 are nested with each other and when opaque shade 112 and transparent shade 114 are both in a fully extended position, access to transparent shade 114 and to second tab 124 is at least partially restricted. For example, only first tab 120 is visible to a passenger seated within passenger compartment 104 (shown in FIG. 1) when first tab 120 and second tab 124 are nested with each other. In addition, a gap 128 is defined between bottom end 122 of opaque shade 112 and second end 118 of window frame 110 when opaque shade 112 is in a fully extended position. Gap 128 is sized to restrict access to transparent shade 114 from passenger compartment 104. As such, the passenger is compelled to retract opaque shade 112 independently of transparent shade 114 when a decision is made to open window assembly 108.

Figure 5:
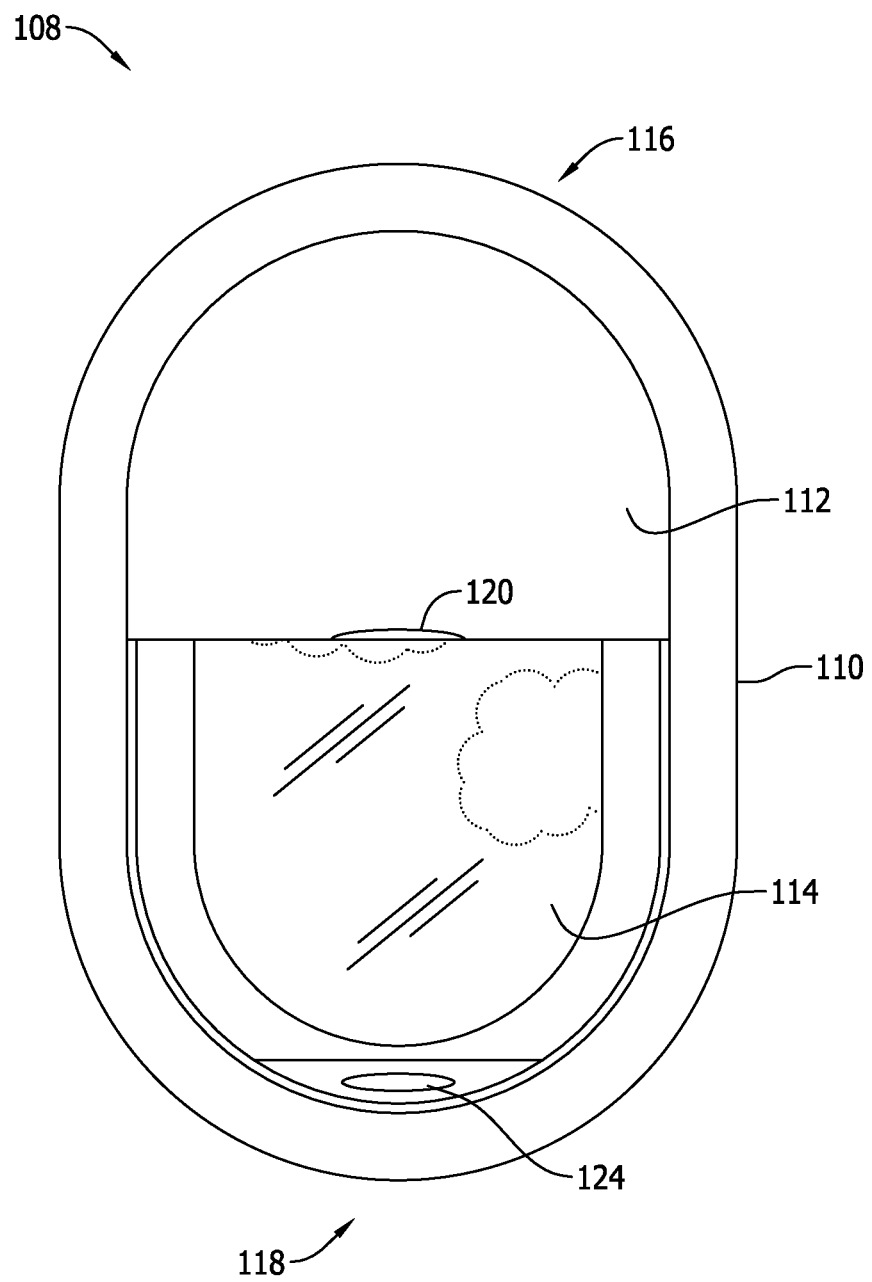
FIG. 5 is an illustration of the window assembly shown in FIG. 2 having the first shade partially drawn and the second shade fully drawn.
Figure 6:
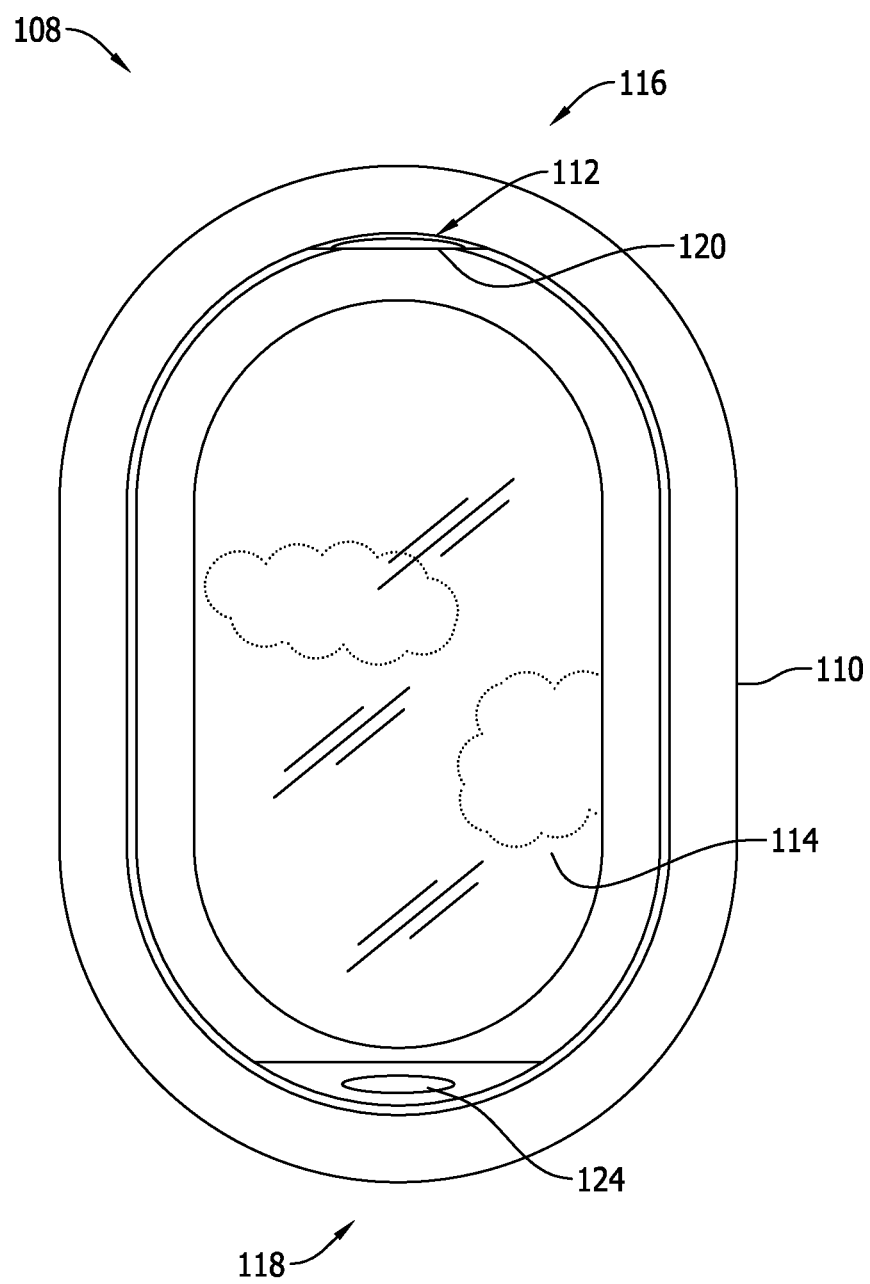
FIG. 6 is an illustration of the window assembly shown in FIG. 2 having the first shade fully retracted and the second shade fully drawn.

Referring to FIGS. 5 and 6, opaque shade 112 is partially retracted (FIG. 5) or fully retracted (FIG. 6), and transparent shade 114 is fully extended and in a closed position. Opaque shade 112 is independently movable relative to transparent shade 114. As such, opaque shade 112 is retractable within first end 116 of window frame 110 while transparent shade 114 remains in the fully extended and closed position. Transparent shade 114 is held in a stationary position relative to opaque shade 112 to restrict inadvertent retraction of transparent shade 114 with opaque shade 112, as will be explained in more detail below. As such, a passenger must make a conscious decision to retract transparent shade 114 and to potentially flood passenger compartment 104 (shown in FIG. 1) with light.

Figure 7:
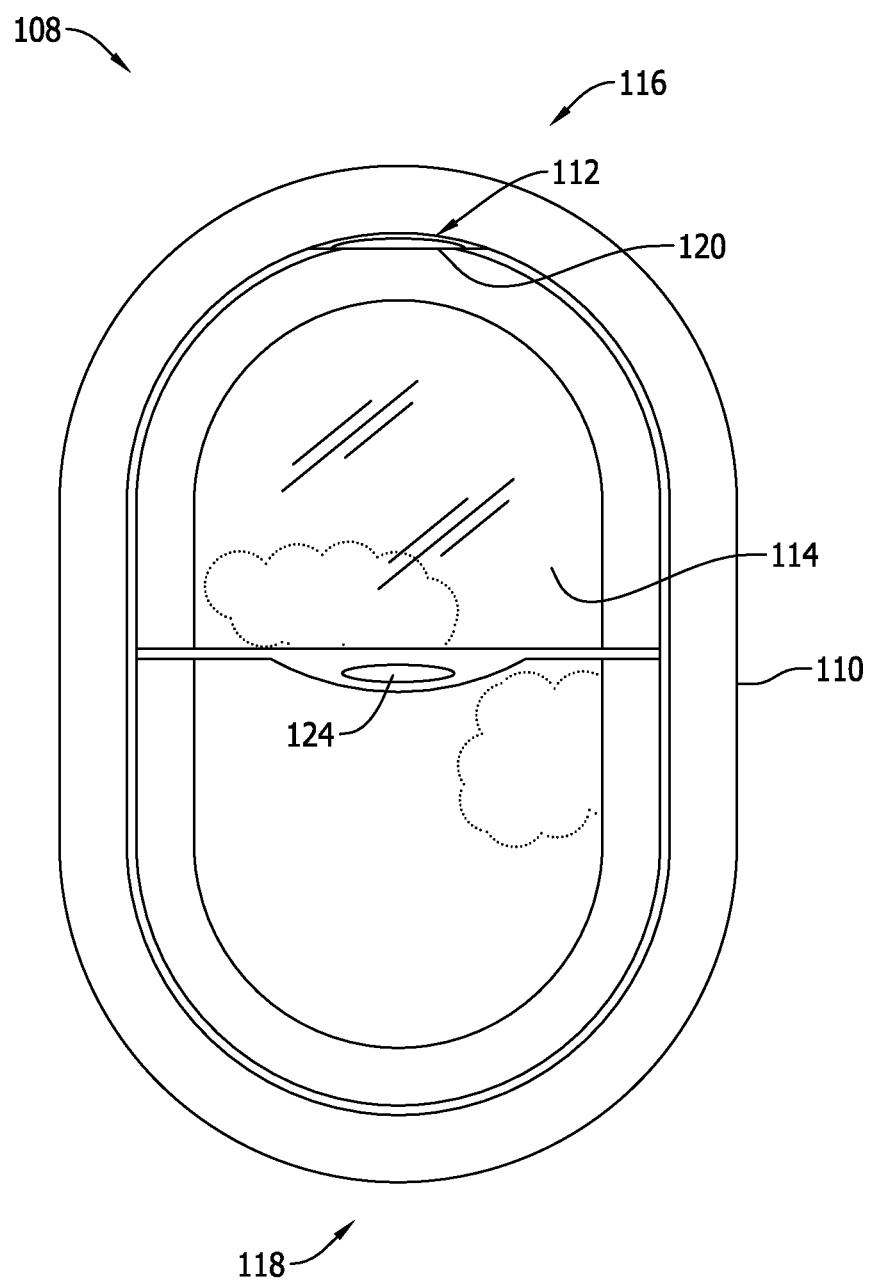
FIG. 7 is an illustration of the window assembly shown in FIG. 2 having the first shade fully retracted and the second shade partially drawn.
Figure 8:
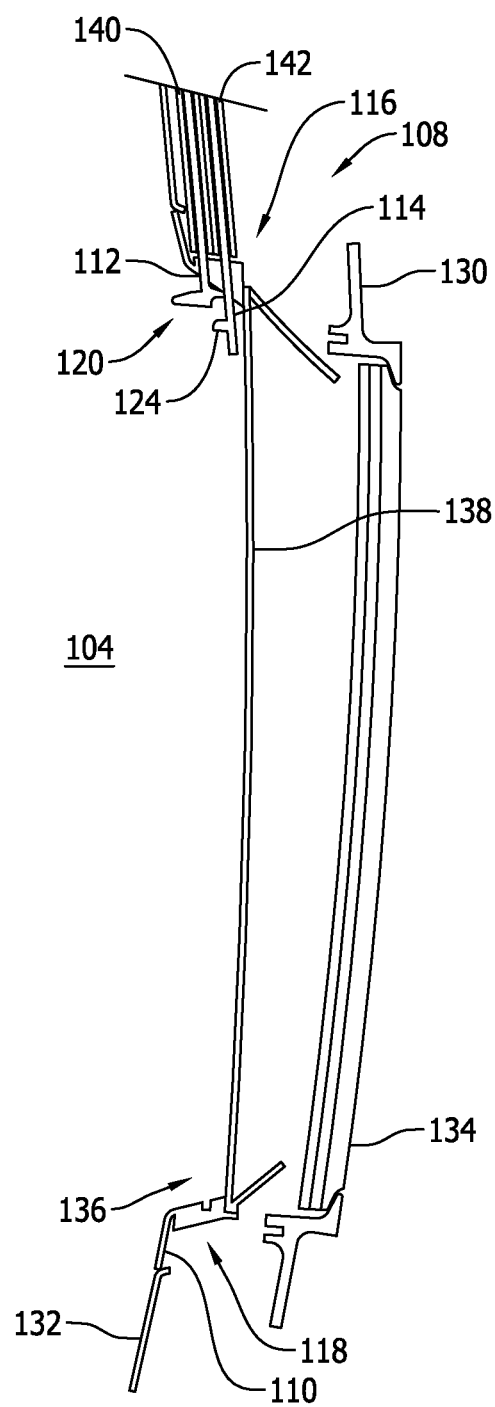
FIG. 8 is a cross-sectional view of the window assembly shown in FIG. 2, taken along Line 8-8.
Figure 9:
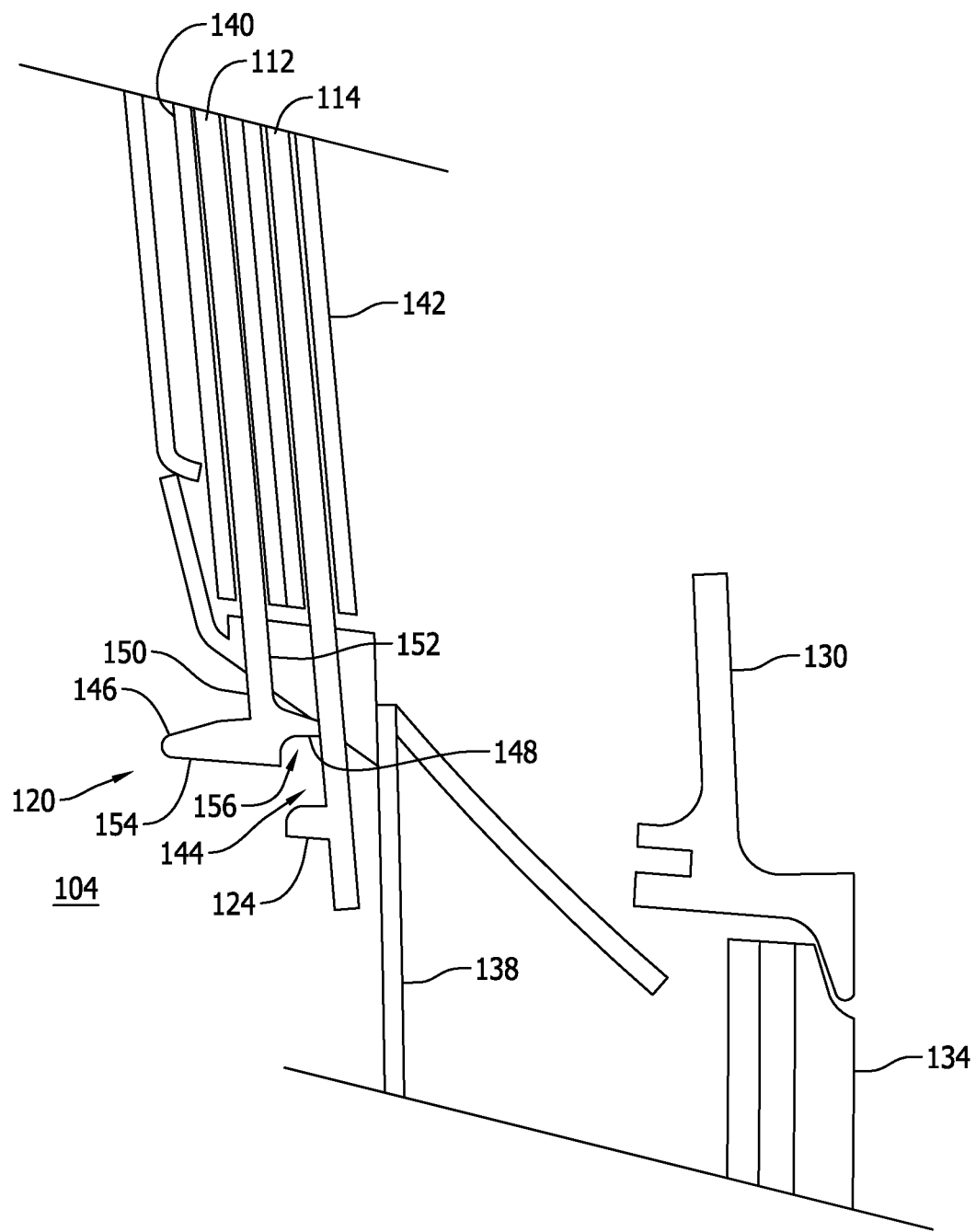
FIG. 9 is an enlarged cross-sectional view of a portion of the window assembly shown in FIG. 8.

Referring to FIG. 7, opaque shade 112 is fully retracted and transparent shade 114 is retracted to an intermediate position between first end 116 and second end 118 (i.e., transparent shade 114 is partially drawn). Retracting opaque shade 112 relative to transparent shade 114 facilitates exposing, and facilitates providing a passenger access to, second tab 124. As such, the passenger has the ability to position transparent shade 114 at any desired location between first end 116 and second end 118.

FIGS. 8-11 are cross-sectional views of window assembly 108. In the example implementation, aircraft 100 includes an exterior skin 130 and an interior wall 132 spaced a distance from exterior skin 130. Exterior skin 130 includes a first window pane 134 coupled thereto, and window frame 110 is coupled to interior wall 132. Window frame 110 includes a window opening 136 and a second window pane 138 that extends across window opening 136.

In the example implementation, window assembly 108 includes a first frictional slide track 140 and a second frictional slide track 142 that are both positioned between exterior skin 130 and interior wall 132. Opaque shade 112 is movable within first frictional slide track 140, and transparent shade 114 is movable within second frictional slide track 142. First frictional slide track 140 and second frictional slide track 142 are vertically offset from window opening 136. As such, first frictional slide track 140 and second frictional slide track 142 are positioned such that opaque shade 112 and transparent shade 114 are both selectively retractable within, and selectively extendable from, first end 116 of window frame 110.

As noted above, first tab 120 and second tab 124 are separated from each other when opaque shade 112 and transparent shade 114 are both in a fully retracted position. For example, referring to FIG. 9, a gap 144 is defined between first tab 120 and second tab 124 when opaque shade 112 and transparent shade 114 are both in the fully retracted position. As such, first tab 120 and second tab 124 are both accessible to a passenger, and either shade may be drawn.

First tab 120 and second tab 124 are configured for selective integration with each other. For example, first tab 120 includes a first portion 146 and a second portion 148. First portion 146 extends from a first side 150 of opaque shade 112 towards an interior (i.e., the passenger compartment 104) of aircraft 100, and second portion 148 extends from a second side 152 of opaque shade 112 towards transparent shade 114. First portion 146 is formed at a bottom edge 154 of opaque shade 112, and second portion 148 is spaced a distance from bottom edge 154. As such, second portion 148 defines a recess 156 in opaque shade 112 sized to receive second tab 124 therein. For example, recess 156 has a depth substantially equal to a thickness of second tab 124, and a width of second tab 124 is less than a width of first tab 120. Thus, second tab 124 is nested within recess 156 to define the integration between first tab 120 and second tab 124. In addition, second portion 148 is positioned closer to first end 116 than second tab 124 to enable the dependent movement of transparent shade 114 with opaque shade 112 and to enable the independent movement of opaque shade 112 relative to transparent shade 114.

Figure 10:
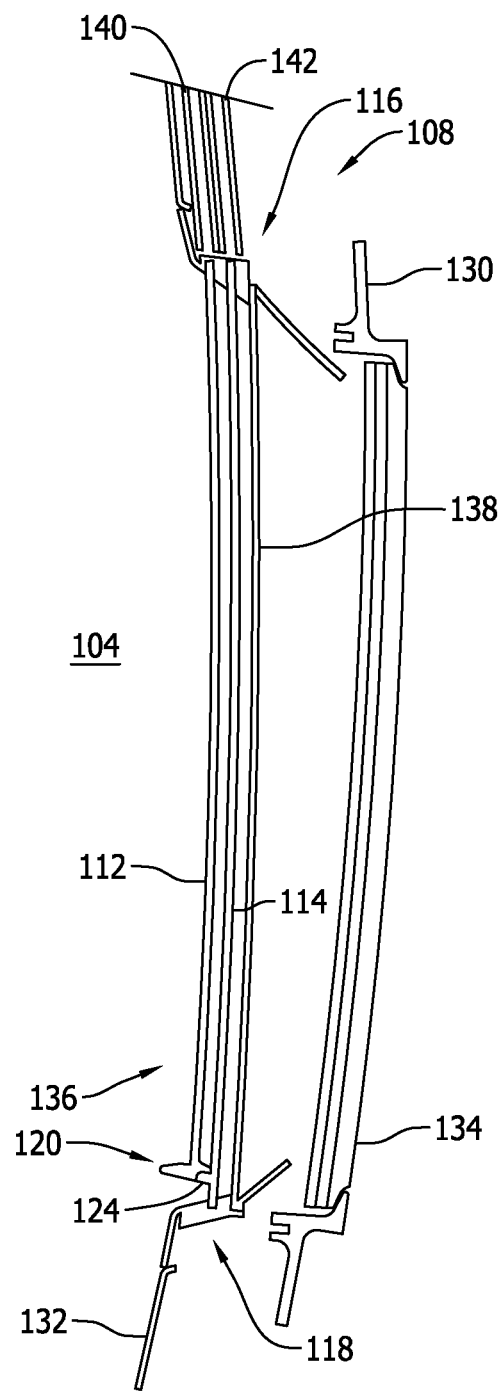
FIG. 10 is a cross-sectional view of the window assembly shown in FIG. 4, taken along Line 10-10.
Figure 11:
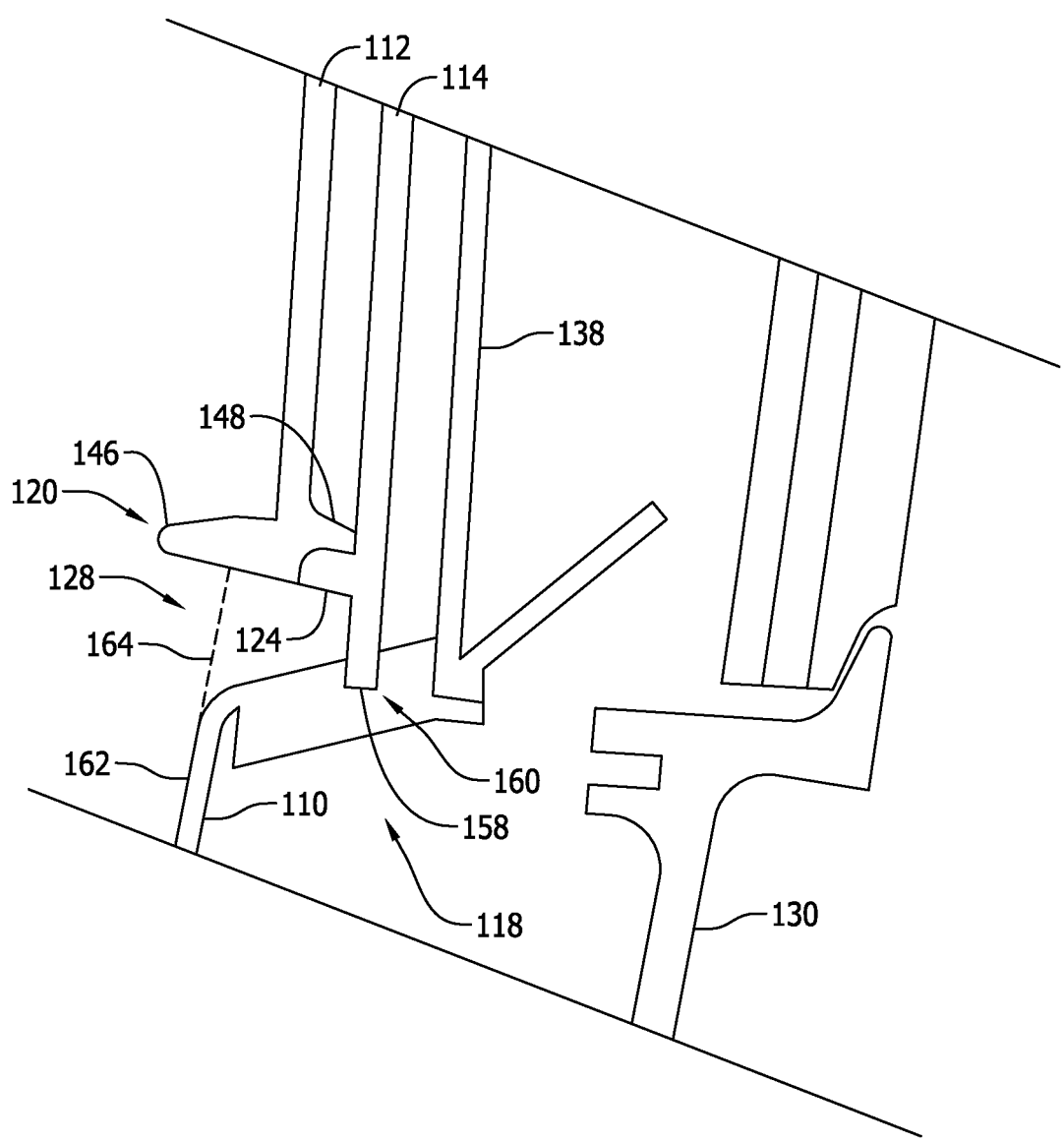
FIG. 11 is an enlarged cross-sectional view of a portion of the window assembly shown in FIG. 10.

Referring to FIG. 10, opaque shade 112 and transparent shade 114 are in a fully extended and closed position. Referring to FIG. 11, second tab 124 is spaced a distance from a bottom edge 158 of transparent shade 114, and window frame 110 includes a receiving slot 160 defined therein at second end 118. Receiving slot 160 is configured to receive bottom end 126 of transparent shade 114 such that transparent shade 114 is secured to window frame 110 when in the fully extended position. In contrast, window frame 110 does not include a receiving slot for receiving bottom end 122 of opaque shade 112, and opaque shade 112 is secured in the fully extended position by virtue of the integration between first tab 120 and second tab 124. The distance defined between second tab 124 and bottom edge 158 is greater than a depth of receiving slot 160. As such, gap 128 is defined between window frame 110 and second tab 124 when transparent shade 114 is in the fully extended position. Gap 128 is sized to enable a passenger's fingers to be inserted therein to facilitate removal of bottom end 126 from receiving slot 160 and lifting of transparent shade 114.

In the example implementation, first tab 120 and second tab 124 are designed to restrict inadvertent retraction of transparent shade 114 with opaque shade 112 when opaque shade 112 and transparent shade 114 are in the fully extended position. For example, window frame 110 includes an interior edge 162 that defines a plane 164 of window opening 136. First tab 120 has a length such that first tab 120 extends beyond plane 164 defined by window frame 110. As such, first tab 120 extends into passenger compartment 104 and is positioned for accessibility by a passenger seated therein. In contrast, second tab 124 is oriented to extend towards an interior of the vehicle (i.e., passenger compartment 104 of aircraft 100), and second tab 124 has a length such that second tab 124 does not extend beyond plane 164 defined by window frame 110. As such, second tab 124 is retracted relative to passenger compartment 104, which increases the difficulty to inadvertently access second tab 124 when attempting to lift opaque shade 112.

Figure 12:
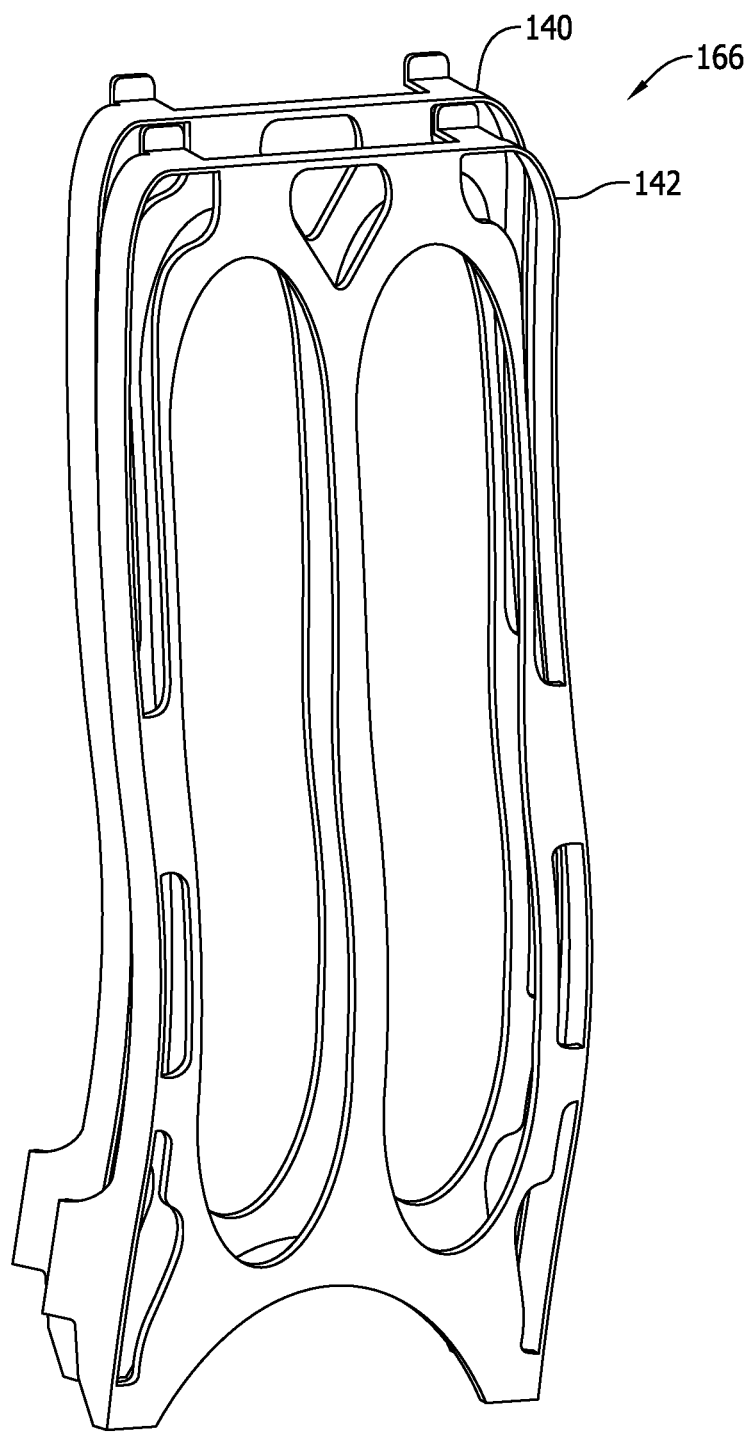
FIG. 12 is a perspective view of an example frictional slide track assembly that may be used in the window assembly shown in FIG. 8.

FIG. 12 is a perspective view of an example frictional slide track assembly 166. In the example implementation, frictional slide track assembly 166 includes first frictional slide track 140 and second frictional slide track 142. First frictional slide track 140 and second frictional slide track 142 may be either formed separately from each other and then coupled together, or may be formed as an integral, unitary, and monolithic structure, such as in a single molding process. In operation, first frictional slide track 140 is configured to hold opaque shade 112 at any location relative to window frame 110 (not shown in FIG. 12), and second frictional slide track 142 is configured to hold transparent shade 114 at any location relative to window frame 110. Opaque shade 112 and transparent shade 114 (not shown in FIG. 12) are positioned within their respective slide tracks with an interference fit. As such, the interference fit facilitates holding opaque shade 112 and transparent shade 114 in a particular location.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A window assembly for use in a vehicle, the window assembly comprising:
   a window frame comprising a first end and a second end opposite the first end;
   an opaque shade movable relative to the window frame, wherein the opaque shade comprises a first tab formed at a bottom end of the opaque shade; and
   a transparent shade movable relative to the window frame, wherein the transparent shade comprises a second tab formed at a bottom end of the transparent shade, wherein the first tab and the second tab are configured for selective integration with each other to enable dependent movement of the opaque shade and the transparent shade with each other, and to enable independent movement of the opaque shade and the transparent shade relative to each other.

2. The window assembly in accordance with claim 1, wherein the first tab comprises a first portion and a second portion, the first portion extending from a first side of the opaque shade, and the second portion extending from a second side of the opaque shade towards the transparent shade.

3. The window assembly in accordance with claim 2, wherein the second portion is configured to define a recess in the opaque shade sized to receive the second tab therein.

4. The window assembly in accordance with claim 3, wherein a depth of the recess is substantially equal to a thickness of the second tab.

5. The window assembly in accordance with claim 1, wherein the opaque shade and the transparent shade are selectively retractable within, and selectively extendable from, the first end of the window frame.

6. The window assembly in accordance with claim 5, wherein the first tab and the second tab are separated from each other when the opaque shade and the transparent shade are both in a fully retracted position.

7. The window assembly in accordance with claim 5, wherein the first tab and the second tab are nested with each other when the opaque shade and the transparent shade are both in a fully extended position.

8. The window assembly in accordance with claim 1, wherein a width of the second tab is less than a width of the first tab.

9. The window assembly in accordance with claim 1, wherein the window frame comprises a receiving slot defined therein at the second end, the receiving slot configured to receive the bottom end of the transparent shade.

10. The window assembly in accordance with claim 9, wherein the second tab is nested within the first tab when the transparent shade is inserted within the receiving slot and the opaque shade is in a fully extended position.

11. A vehicle comprising:
    an exterior skin;
    an interior wall spaced a distance from the exterior skin;
    a window frame coupled to the interior wall, the window frame comprising a first end and a second end opposite the first end;
    an opaque shade movable relative to the window frame, wherein the opaque shade comprises a first tab formed at a bottom end of the opaque shade; and
    a transparent shade movable relative to the window frame, wherein the transparent shade comprises a second tab formed at a bottom end of the transparent shade, wherein the first tab and the second tab are configured for selective integration with each other to enable dependent movement of the opaque shade and the transparent shade with each other, and to enable independent movement of the opaque shade and the transparent shade relative to each other.

12. The vehicle in accordance with claim 11, wherein the first tab is oriented to extend towards an interior of the vehicle, the first tab having a length such that the first tab extends beyond a plane defined by the window frame.

13. The vehicle in accordance with claim 11, wherein the second tab is oriented to extend towards an interior of the vehicle, the second tab having a length such that the second tab does not extend beyond a plane defined by the window frame.

14. The vehicle in accordance with claim 11, wherein the window frame comprises a receiving slot defined therein at the second end, the receiving slot configured to receive the bottom end of the transparent shade.

15. The vehicle in accordance with claim 14, wherein the transparent shade comprises a bottom edge, the second tab spaced a distance from the bottom edge, wherein the distance is greater than a depth of the receiving slot such that a gap is defined between the window frame and the second tab when the transparent shade is in a fully extended position.

16. A window assembly for use in a vehicle, the window assembly comprising:
    a window frame comprising a first end and a second end opposite the first end;
    an opaque shade movable relative to the window frame, wherein the opaque shade comprises a first tab formed at a bottom end of the opaque shade; and
    a transparent shade movable relative to the window frame, wherein the transparent shade comprises a second tab formed at a bottom end of the transparent shade, wherein the first tab and the second tab are configured for selective integration such that the second tab is exposed when the opaque shade is retracted relative to the transparent shade, and such that the second tab is hidden when the opaque shade is coextensive with the transparent shade.

17. The window assembly in accordance with claim 16, wherein the second tab is nested within the first tab when the opaque shade is coextensive with the transparent shade.

18. The window assembly in accordance with claim 16, wherein the first tab comprises a first portion and a second portion, the first portion extending from a first side of the opaque shade, and the second portion extending from a second side of the opaque shade towards the transparent shade.

19. The window assembly in accordance with claim 18, wherein the second portion comprises a recess sized to receive the second tab therein.

20. The window assembly in accordance with claim 19, wherein a depth of the recess is substantially equal to a thickness of the second tab.

\* \* \* \* \*